(No Model.)
R. STEEL.
VELOCIPEDE.
No. 376,051. Patented Jan. 3, 1888.
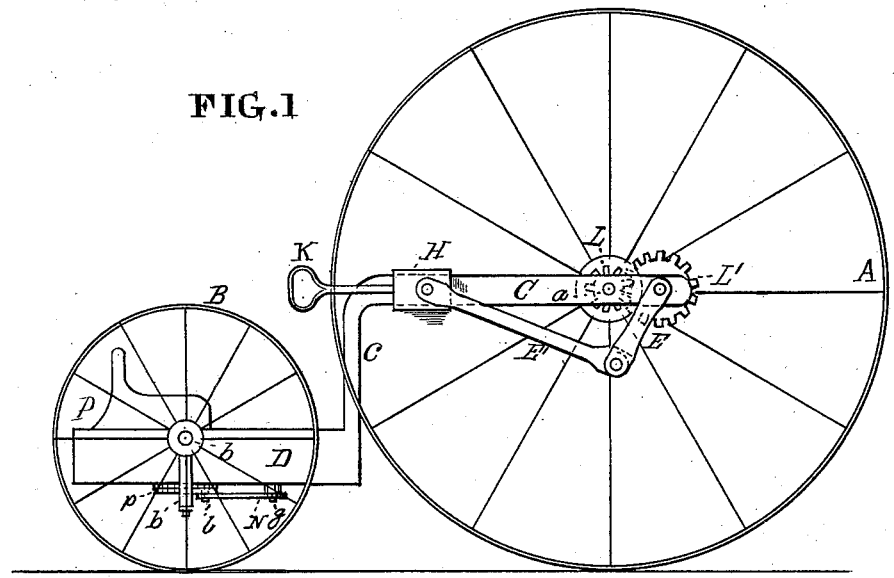
FIG. 1
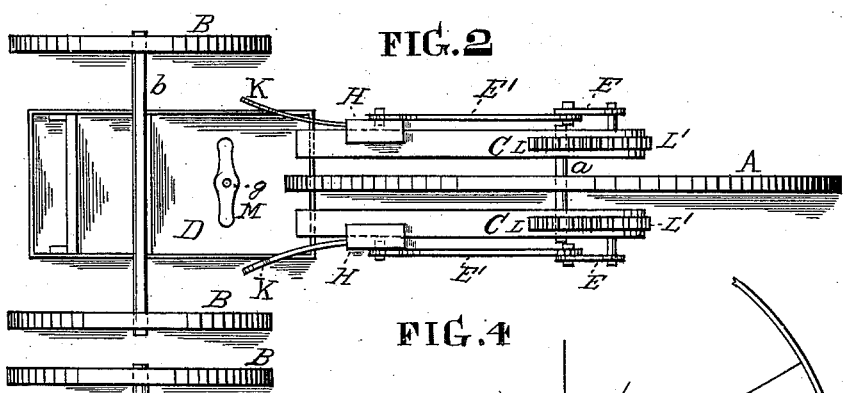
FIG. 2
FIG. 3
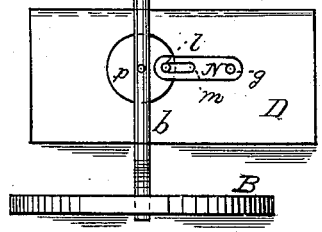
FIG. 4
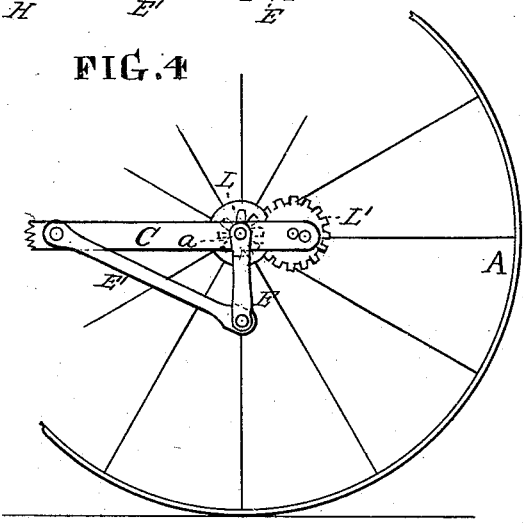
Witnesses.
Harry V. Hall.
Albert F. Wernle.
Inventor.
Robert Steel.
per Thomas J. Bewley, Atty.

UNITED STATES PATENT OFFICE.

ROBERT STEEL, OF PHILADELPHIA, PENNSYLVANIA, ASSIGNOR OF THREE-FOURTHS TO HENRY T. SPRING, AUGUSTUS BOAS SWARTZ, AND CHARLES A. SPRING, ALL OF SAME PLACE.

VELOCIPEDE.

SPECIFICATION forming part of Letters Patent No. 376,051, dated January 3, 1888.

Application filed September 12, 1887. Serial No. 249,525. (No model.)

*To all whom it may concern:*

Be it known that I, ROBERT STEEL, a citizen of the United States, residing at Philadelphia, in the county of Philadelphia and State of Pennsylvania, have invented certain new and useful Improvements in Velocipedes, of which the following is a specification.

The invention relates particularly to an improvement in tricycles, in which the apparatus is guided or steered by intermediate mechanism attached to the rear axle, and also to the arrangement upon the horizontal standing-frame of a pair of arms upon the slides attached to slides connecting rods, and cranks, with intermediate cog-gearing, capable of detachment, whereby the desired force necessary to be exerted in propulsion can be regulated, as will be more fully understood from the following description.

In the accompanying drawings, which make a part of this specification, Figure 1 is a side view of the apparatus. Fig. 2 is a plan view. Fig. 3 is a view of the under surface of the carriage D and steering device. Fig. 4 is a side view of a portion of the apparatus.

Like letters of reference in all the figures indicate the same parts.

A is the front wheel on the rigid axle $a$.

B are the rear wheels on the pivoted axle $b$.

C is the horizontal standing-frame, composed of two parallel bars, in the forward ends of which the axle $a$ has bearings, and connected to the carriage D by the arms $c$.

E are the cranks, and E' the connecting-rods, which have pivotal connection with each other upon the sides, an end of each rod being pivoted to the slides H, which traverse upon the frame C.

K are the grip-handles attached to said slides.

L L' are pairs of gear-wheels meshing together, L, the small pair, rigid on the axle $a$, while the larger, L', have independent bearings $a'$ on the extremities of frame C, the object being to connect the upper ends of the cranks D to the ends of the axle $a$ or bearings at will when either power or speed of action is desired. (See alternate change in Figs. 1 and 4.)

The guidance of the apparatus is regulated by the feet of the operator resting upon the swivel-bar M on the stud-pin $g$, passing through the floor of the carriage into and with the rod N, having pivotal connection, by means of the pin $l$ and slot $m$, with the disk $p$, rigid upon and oscillating with the axle $b$.

The mode of operation is as follows: The rider, occupying seat P in carriage D, grasps the handles K, attached to slides H, and by a reciprocating forward and backward movement of the body, alternating with the cranks, guidance and propulsion of the carriage is effected through the intermediates from the bar M to the swivel-axle $b$. The gear-wheels L', having double the number of teeth that the wheels L have and meshing together, will revolve but once during two revolutions of the latter, causing two rotations of the wheel A to one forward and backward movement of the operator, which would propel the vehicle with sufficient velocity upon fair and level roads; but in a hilly country, or where more direct power is desired, the ends of the cranks are connected with the axle $a$, (see Fig. 4,) a nut attachment to a screw-thread being all that is necessary.

I claim as my invention and desire to secure by Letters Patent—

1. The combination of the sliding crossheads H, having grip-handles K, with the connecting-rods E, cranks E', frame C, and gear-wheels L L', in the manner and for the purpose herein shown and described.

2. The combination of the sliding crossheads H, provided with grips K, rods E, cranks E', frame C, and wheels L L', interchangeable by means of the cranks E', to effect rotary propulsion at the desired speed or power of action, as herein shown and described.

ROBERT STEEL.

Witnesses:
THOMAS J. BEWLEY,
FRANK SCHMIDT.